L. D. PEIK & W. LEHMAN.
MILKING MACHINE.
APPLICATION FILED APR. 13, 1911.
995,804.
Patented June 20, 1911.
3 SHEETS—SHEET 1.
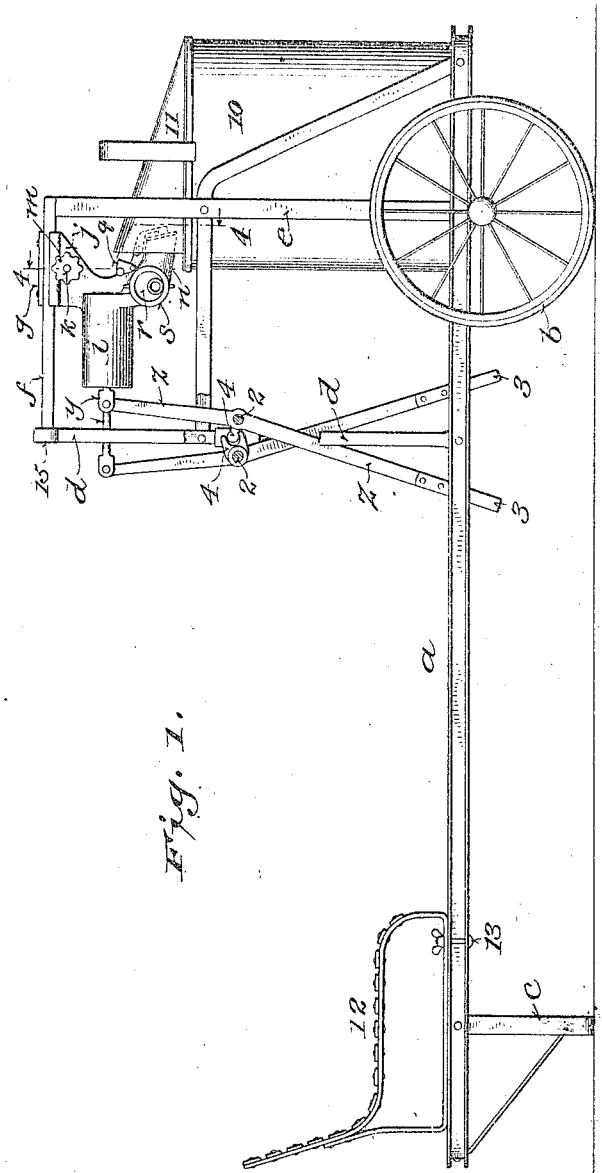
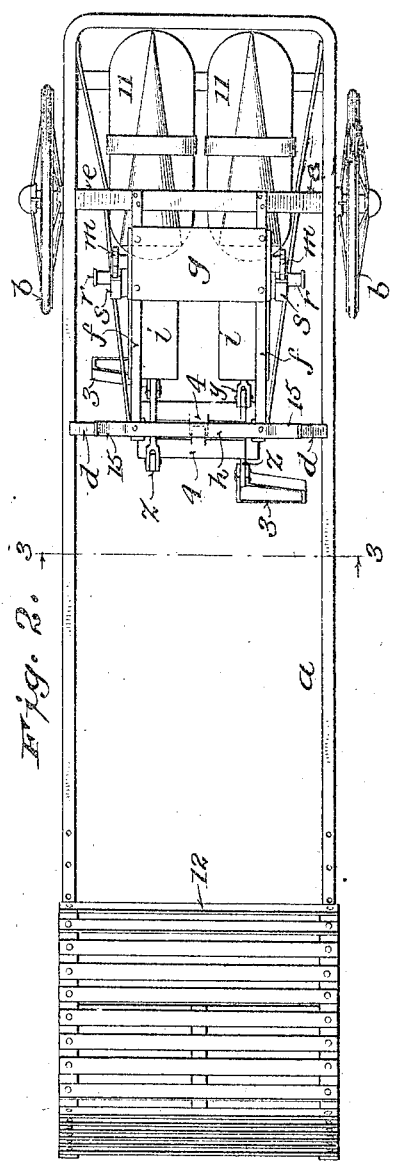

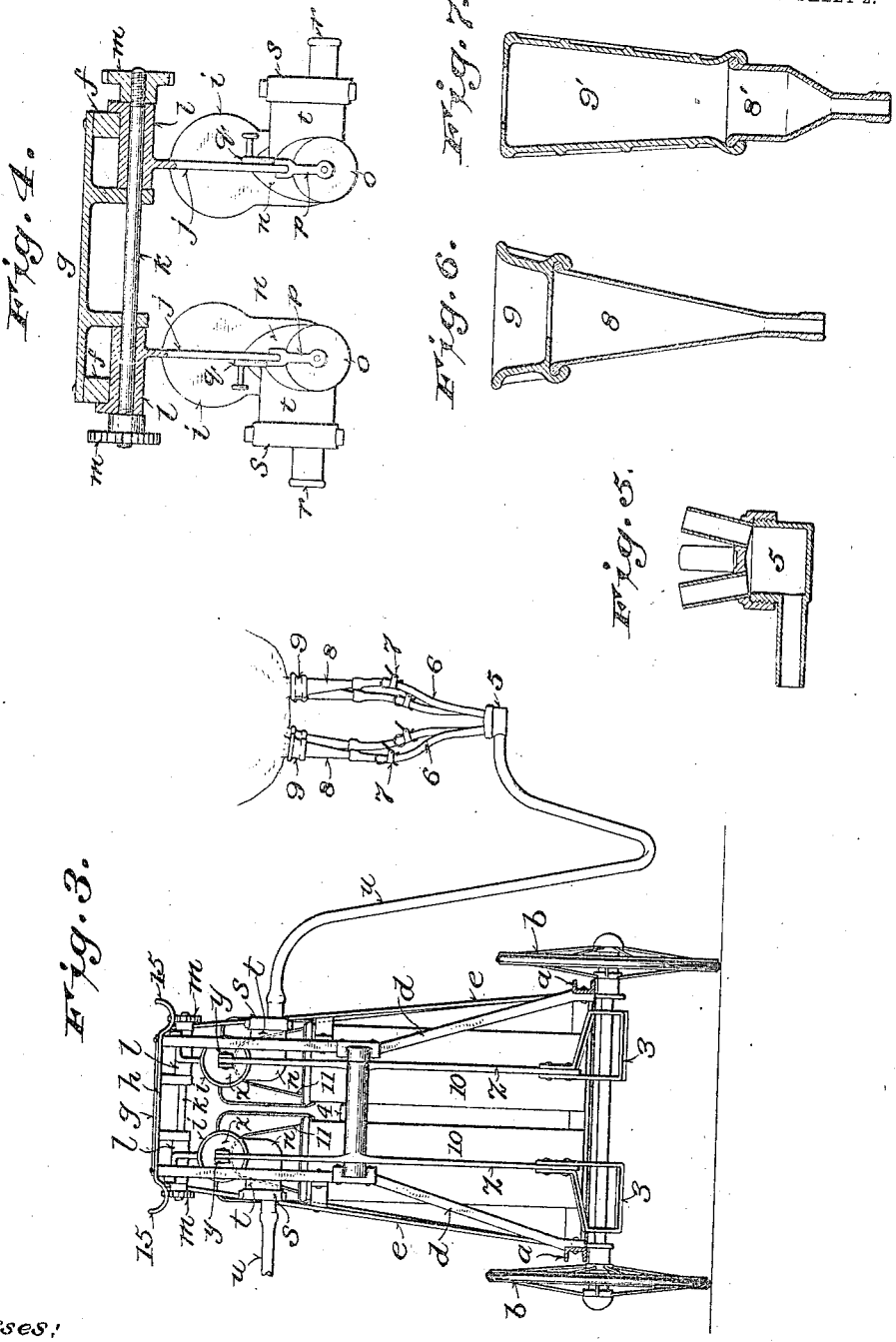

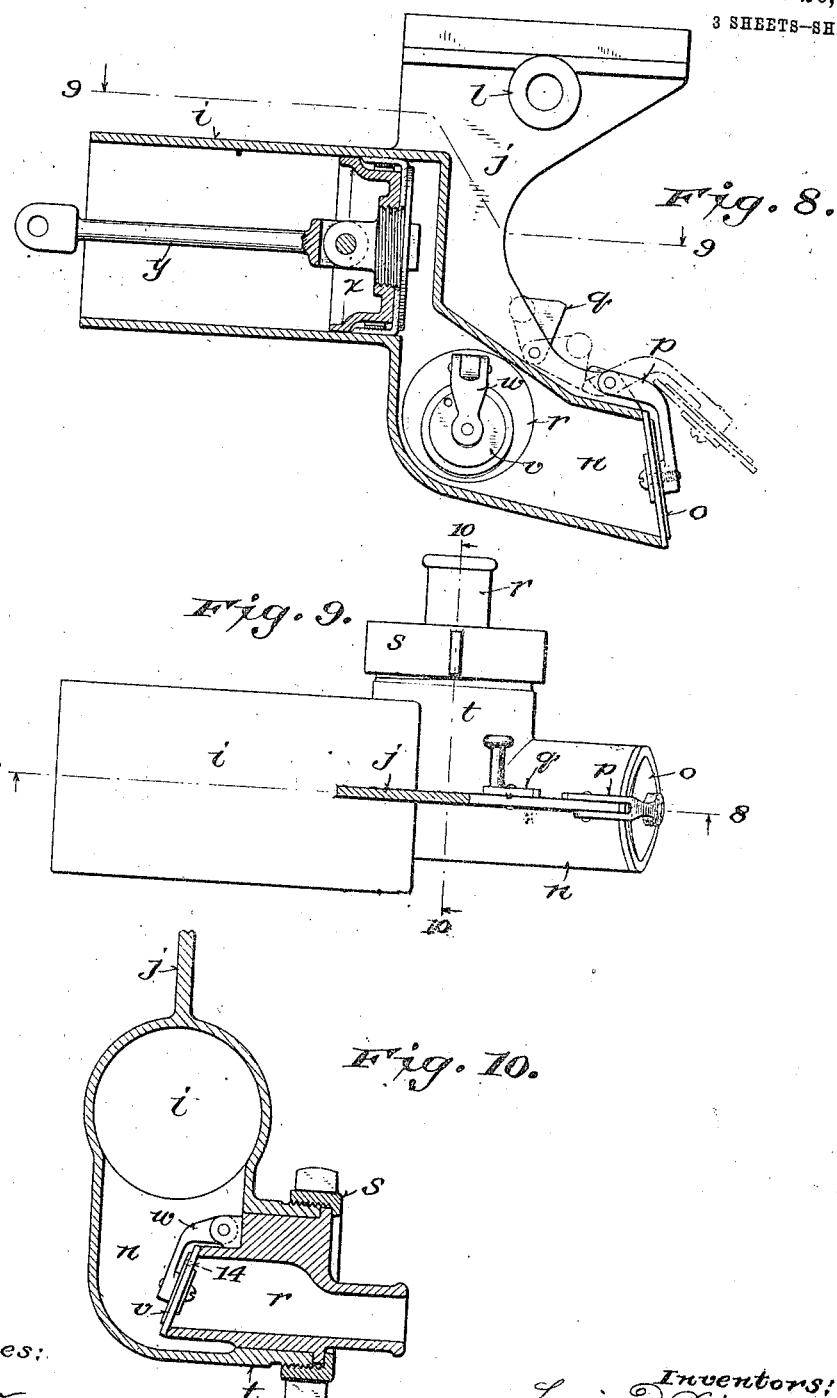

UNITED STATES PATENT OFFICE.

LOUIS D. PEIK AND WERNER LEHMAN, OF SOUTH MILWAUKEE, WISCONSIN.

MILKING-MACHINE.

995,804. Specification of Letters Patent. Patented June 20, 1911.

Application filed April 13, 1911. Serial No. 620,726.

*To all whom it may concern:*

Be it known that we, Louis D. Peik, a citizen of the United States, and Werner Lehman, a citizen of the Republic of Switzerland, residing at South Milwaukee, in the county of Milwaukee and State of Wisconsin, have invented certain new and useful Improvements in Milking-Machines, of which the following is a specification, reference being had to the accompanying drawing, forming a part thereof.

The main objects of this invention are to reduce the labor and expedite the operation of milking; to imitate in the operation of a milking machine the action of a calf in sucking and thus avoid injury and discomfort to cows; to enable a single operator to milk two cows at the same time; to produce an easily operated and thoroughly sanitary machine having few and simple working parts which can be readily detached, removed, scalded, cleaned and replaced; and generally to improve the construction and operation of machines of this class.

It consists in the construction, arrangement and combination of parts as hereinafter particularly described and defined in the claims.

In the accompanying drawing like characters designate the same parts in the several figures.

Figure 1 is a side elevation of a machine embodying the invention; Fig. 2 is a plan view of the same; Fig. 3 is a vertical cross section on the line 3 3, Fig. 2; Fig. 4 is an enlarged vertical cross section on the line 4 4, Fig. 1, showing the manner of detachably mounting the pump cylinders on the frame; Fig. 5 is an enlarged section of a junction case for connecting several teat cups with a single hose; Figs. 6 and 7 are enlarged sectional views of teat cups and sight glasses for teats of different sizes; Fig. 8 is an enlarged vertical longitudinal section of one of the pump cylinders and pistons; Fig. 9 is a plan view of the same and horizontal section on the line 9 9, Fig. 8; and Fig. 10 is a vertical cross section on the line 10 10, Fig. 9.

Referring to Figs. 1, 2 and 3 of the drawing, a light portable frame $a$, which may be conveniently constructed, as shown, of a channel or angle metal bar, is mounted adjacent to one end upon wheels $b$, and provided adjacent to the other end with legs $c$, so that it can be easily moved with the apparatus and attachments mounted thereon, from place to place, like a wheelbarrow or two-wheeled truck. Standards or uprights $d$ and $e$ fastened at their lower ends to the sides of the frame $a$, are connected at their upper ends by longitudinal bars $f$ and cross bars or plates $g$ and $h$.

Two pump cylinders $i$ formed with hangers $j$, are suspended parallel with each other and the sides of the frame $a$ by the hangers $j$ from the bars $f$ and the cross bar or plate $g$, to which they are detachably fastened, as shown in Fig. 4, by a cross rod $k$ passing through depending flanges or webs on the bar or plate $g$ and sleeves $l$ of the hangers $j$ and threaded and provided with nuts $m$ at its ends. Each cylinder is formed or provided at one end, mainly below the lower side thereof, with a discharge spout or vacuum chest $n$, as shown in detail in Figs. 8, 9 and 10. This spout or chest is inclined downwardly from the cylinder with which it communicates at its upper end and is provided at its opposite and lower end with an outwardly opening discharge valve $o$ hinged to the upper side thereof by an elbow-shaped arm $p$, as shown in Figs. 8 and 9. A latch or detent $q$ pivoted to the upper side of the spout or chest $n$ is adapted when turned down, as indicated by dotted lines on Fig. 8, to engage with the end of the arm $p$ and hold the discharge valve $o$ open, thereby rendering the associated pump inoperative. Each spout or chest $n$ is formed as shown in Figs. 9 and 10, with a lateral inlet opening in which is removably fitted an outwardly flanged tubular suction connection $r$, which is secured in place in said opening by a flanged coupling ring $s$, threaded on a flange or extension $t$ of said spout or chest around said inlet opening. At its outer end the suction connection $r$ is formed into a nipple as shown in Fig. 10, for the attachment thereto of a rubber hose $u$, as shown in Fig. 3. At its inner end, which opens into the spout or chest $n$, it is provided with an outwardly closing suction valve $v$, which is hinged to the upper part thereof by an elbow-shaped arm $w$, said valve being formed with a bypass opening 14, and being movable in opening and closing across or transversely to the axis of the spout or chest $n$ and the direction of the discharge flow of milk therein. The outer end of the spout or chest $n$ against which the discharge valve $o$ is seated, and the inner end of the tubular suction connection $r$, against which the suction valve $v$ is seated, are inclined or oblique to vertical planes cutting the hinges of the valves lengthwise, so that the valves which are seated automatically by gravity, will close and remain closed tightly against their seats.

Each pump cylinder $i$ is open at the end opposite the spout or chest $n$, and is provided with a piston $x$ which is connected by a rod $y$ passing through the open end of the cylinder with the upper end of a vertical lever $z$. The two levers $z$ are fulcrumed or pivoted, as shown in Fig. 1, on parallel cross rods 2, which are supported at the ends by the standards or uprights $d$, as shown in Fig. 3. At their lower ends they are provided with pedals 3 and they are connected concentric with their fulcrums, as shown in Fig. 1, by segment gears 4, so that as one pedal is pushed forward, the other pedal will be pushed backward, and the pistons $x$ will be simultaneously moved in opposite directions.

Each suction hose $u$ is attached as shown in Fig. 3, to a junction case 5, shown in detail in Fig. 5, and each junction case is connected by four rubber tubes 6 with sight glasses and elastic teat cups for milking a single cow. The tubes 6 are each provided as shown in Fig. 1, with clamps 7 for separately closing communication between the several teat cups and the pump, so that when any teat is milked dry, the cup thereon may be cut off from the pump and thus prevent injury to the cow without interrupting the operation of the other cups. Two different forms of sight glasses 8 8', and two different forms of teat cups, 9 9', to fit teats of different shapes and sizes, are shown in Figs. 6 and 7, the cups as well as the glasses being interchangeable.

Separate cans or receptacles 10, provided with hooded covers 11 are provided for the two pumps, so that the milk from different cows can be kept separate. These cans are removably supported upon cross pieces of the frame $a$, as shown in Figs. 1, 2 and 3. A seat 12 for the operator, is adjustably fastened by bolts 13 to the side pieces of the frame, so that it can be moved toward or from the pedals 3 according to the length of the operator's legs. The cross bar or plate $h$ is formed at the ends as shown in Fig. 3, into hooks 15 upon which the teat cups and their hose connections are hung when not in use.

In the operation of the machine, it is placed between two cows with the back of the seat directed toward their heads. The teat cups 9 being placed on the teats of the cows, the operator occupying the seat 12, works the pedals 3 with his feet back and forth, his hands being left free to manipulate the udders of the cows and to control the operation of the pumps on each cow, as well as on the several teats of each cow, by the proper adjustments of the latches or detents $q$ and the clamps 7. If one cow is milked dry before the other, the latch or detent $q$ of the pump connected with that cow, is thrown into position as indicated by dotted lines on Fig. 8, to lock and hold the discharge valve $o$ open. That pump is thus rendered inoperative, its piston working back and forth drawing air into and discharging it from the spout or chest $n$, without effect in the hose $u$ and teat cups connected therewith. When any teat of a cow is milked dry before the others, the clamp 7 on the tube leading to the cup on that teat is closed, thereby relieving the teat from further suction.

In the operation of each pump, as the piston is withdrawn toward the open end of the cylinder, the discharge valve $o$ being closed, a partial vacuum is formed in the spout or chest $n$ and the suction valve $v$ is thereby opened and a partial vacuum is created in each of the teat cups which are in open communication with the pump. Upon the return stroke of the piston the vacuum in the spout or chest $n$ is destroyed, the discharge valve $o$ is opened and the milk contained in said spout or chest is delivered into the can 10. As the milk flowing in its discharge from the spout or chest $n$ passes the suction valve $v$ edgewise thereof, and said valve moves in closing transversely to the discharge flow of the milk, its movement in closing effected by gravity, will be gradual and somewhat retarded, thereby permitting a small amount of milk with air to flow back into the suction connection $r$. In this way an intermittent suction or pulsating effect is produced in the milk cups upon the teats of the cow, similar to the natural action of a calf in sucking. This intermittent action or pulsating effect of the pump is increased by the back flow of air through the bypass 14 in the suction valve $v$ when it is closed during the discharge stroke of the piston.

The sight glasses 8 enable the operator to detect bloody or colored milk flowing from any teat and to instantly cut that teat off from the pump by closing the clamp 7.

Various changes in the minor details of construction and arrangement of parts may be made without materially affecting the operation of the machine and without departure from the principle and scope of the invention.

We claim:

1. In a milking machine the combination of a carriage or portable frame, a horizontally disposed pump cylinder mounted thereon and having suction and discharge connections and valves adjacent to one end, a piston fitted in said cylinder and vertically disposed intergeared foot levers fulcrumed in said frame and adapted to swing simultaneously in opposite directions, one of said levers being connected at its upper end with said piston.

2. In a milking machine the combination of a portable frame, horizontally disposed pump cylinders mounted on said frame parallel with each other and each provided at one end with suction and discharge connections and valves, pistons fitted in said cylinders, and vertically disposed intergeared foot levers fulcrumed in said frame and connected at their upper ends with said pistons.

3. In a milking machine the combination of a frame, a horizontally disposed cylinder mounted thereon and provided with a piston and with suction and discharge connections and valves, vertically disposed levers fulcrumed in said frame and intergeared to swing simultaneously in opposite directions, said levers being provided at their lower ends with pedals and one of them being connected at its upper end with said piston, and a seat mounted on said frame and adjustable toward and from said levers.

4. In a milking machine the combination of a portable frame, a horizontally disposed pump cylinder removably mounted thereon and provided at one end with suction and discharge connections and valves, the other end of the cylinder being open, a piston fitted in said cylinder, vertically disposed intergeared foot levers fulcrumed in said frame and provided at their lower ends with pedals, one of said levers being connected with said piston by a rod passing through the open end of the cylinder, and a seat mounted on said frame.

5. In a milking machine the combination of a pump cylinder having a discharge spout at one end, an outwardly opening discharge valve at the end of said spout, a lateral suction connection opening into said discharge spout, and an inwardly opening suction valve at the inner end of said connection movable in opening and closing transversely to the discharge flow of milk through said spout.

6. In a milking machine the combination of a pump cylinder having a discharge spout at one end, an outwardly opening discharge valve at the outer end of said spout, and a tubular suction connection removably fitted and secured in a lateral opening in said spout and provided at its inner end with a suction valve movable in opening and closing transversely to the discharge flow of milk in said spout.

7. In a milking machine the combination of a pump cylinder having a discharge spout at one end, an outwardly opening discharge valve at the outer end of said spout, a suction connection opening into said discharge spout and having an inwardly opening suction valve, and a return bypass from the discharge spout into the suction connection.

8. In a milking machine the combination of a pump cylinder having a discharge spout at one end provided with an outwardly opening discharge valve, a suction connection opening into said discharge spout and provided with an inwardly opening suction valve, and means for locking and holding the discharge valve open.

9. In a milking machine the combination of a pump cylinder provided with a piston and having a receiver and discharge spout at one end and mainly below the cylinder, a self closing, outwardly opening valve controlling the discharge opening of said receiver and discharge spout and a suction connection opening into said receiver and discharge spout and provided with a self closing, inwardly opening valve controlling the inlet to said receiver and discharge spout.

In witness whereof we hereto affix our signatures in presence of two witnesses.

LOUIS D. PEIK.
WERNER LEHMAN.

Witnesses:
H. J. CHESICK,
R. S. PORTER.